United States Patent
Masui

(10) Patent No.: US 12,143,016 B2
(45) Date of Patent: Nov. 12, 2024

(54) SWITCHING POWER SUPPLY APPARATUS USING TWO DUTY-CONTROLLED PULSE SIGNALS FOR CONTROLLING DC/DC CONVERTER

(71) Applicant: Yazaki Corporation, Tokyo (JP)

(72) Inventor: Hideaki Masui, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 211 days.

(21) Appl. No.: 17/851,209

(22) Filed: Jun. 28, 2022

(65) Prior Publication Data

US 2023/0008468 A1   Jan. 12, 2023

(30) Foreign Application Priority Data

Jul. 12, 2021 (JP) ................................ 2021-115241

(51) Int. Cl.
*H02M 1/36* (2007.01)
*H02J 7/34* (2006.01)
*H02M 1/00* (2006.01)
*H02M 3/158* (2006.01)

(52) U.S. Cl.
CPC ............. *H02M 3/158* (2013.01); *H02J 7/345* (2013.01); *H02M 1/0025* (2021.05); *H02M 1/36* (2013.01); *H02J 2207/50* (2020.01)

(58) Field of Classification Search
CPC ...... H02M 1/36; H02M 1/0025; H02M 3/157; Y02T 10/70; H02J 7/345; H02J 2207/50
See application file for complete search history.

(56) References Cited

U.S. PATENT DOCUMENTS

| 7,709,976 B2 | 5/2010 | Bazinet | |
| 2003/0042880 A1* | 3/2003 | Kataoka | H02M 3/1582 323/282 |
| 2008/0238397 A1* | 10/2008 | Chen | H02M 1/36 323/288 |
| 2009/0179613 A1 | 7/2009 | Masho | |
| 2011/0057635 A1* | 3/2011 | Ishikawa | H02M 1/36 323/282 |
| 2014/0049994 A1* | 2/2014 | Ishii | H02M 1/36 363/49 |

(Continued)

FOREIGN PATENT DOCUMENTS

| CA | 2758898 A1 | 5/2013 |
| CN | 101295922 B | 3/2011 |

(Continued)

OTHER PUBLICATIONS

Communication issued on Dec. 11, 2023 by European Patent Office in corresponding EP Application No. 22184101.8.

*Primary Examiner* — Kyle J Moody
*Assistant Examiner* — Jye-June Lee
(74) *Attorney, Agent, or Firm* — Sughrue Mion, PLLC

(57) ABSTRACT

A DC/DC converter has a EFT, and converts a power supply voltage from EDLC by turning on and off the FET. A control unit outputs a first PWM signal whose duty gradually decrease from 100% to the FET when the power supply from the EDLC to the DC/DC convertor is started. Thereafter, the control unit outputs a second PWM signal having a duty controlled so that an output voltage or an output current of the DC/DC converter becomes a reference value to the FET.

4 Claims, 3 Drawing Sheets

(56) References Cited

U.S. PATENT DOCUMENTS

| | | | | |
|---|---|---|---|---|
| 2016/0043641 A1* | 2/2016 | Nishimura | .......... | H02M 3/1582 |
| | | | | 323/271 |
| 2021/0028644 A1 | 1/2021 | Wataru et al. | | |
| 2023/0170713 A1* | 6/2023 | Kai | ............. | H02J 1/001 |
| | | | | 307/64 |

FOREIGN PATENT DOCUMENTS

| | | | |
|---|---|---|---|
| EP | 2973968 B1 | | 4/2018 |
| JP | 2014102890 A | * | 6/2014 |
| JP | 2021-23093 A | | 2/2021 |

\* cited by examiner

SWITCHING POWER SUPPLY APPARATUS USING TWO DUTY-CONTROLLED PULSE SIGNALS FOR CONTROLLING DC/DC CONVERTER

CROSS-REFERENCE TO RELATED APPLICATIONS

This application is based on and claims priority under 35 USC 119 from Japanese Patent Application No. 2021-115241 filed on Jul. 12, 2021, the contents of which are incorporated herein by reference.

TECHNICAL FIELD

The present invention relates to a switching power supply apparatus.

BACKGROUND ART

It has been proposed to mount a high-capacity electric double-layer capacitor (EDLC) on an automobile in response to demands for downsizing of an automobile battery, improvement of the number of times of endurance, life, and instantaneous load current supply (Patent Literature 1). The EDLC is used as a backup power supply, or is used, similarly to a normal battery, as a drive source for an electric motor or a starter motor, and for recovery of regenerative energy.

Since only one EDLC cannot cope with a large capacity required by the automobile, a plurality of EDLCs are connected in parallel or in series to achieve the large capacity.

In addition, in consideration of deterioration over time, it is necessary to increase the number of EDLCs connected in parallel or in series, which leads to an increase in cost and size. Therefore, in order to reduce the number of EDLCs, it is considered to provide a DC/DC converter at an output stage of the EDLCs, so that a desired voltage can be obtained even when the EDLCs are deteriorated.

However, there is a problem that the DC/DC converter cannot immediately convert a voltage into the desired voltage at the time of power supply from the EDLCs, and a delay occurs in the output.

CITATION LIST

Patent Literature

Patent Literature 1: JP-A-2021-23093

SUMMARY OF INVENTION

The present invention has been made in view of the above circumstances, and an object of the present invention is to provide a switching power supply apparatus capable of reducing an output delay.

In order to achieve the above object, a switching power supply apparatus according to the present invention includes:
  a DC/DC converter having a first switch and configured to convert an input voltage by turning on and off the first switch; and
  a control unit configured to output, when supply of the input voltage to the DC/DC converter is started, a first pulse signal whose duty gradually decreases from 100% to the first switch, and then output a second pulse signal having a duty controlled so that an output voltage or an output current of the DC/DC converter becomes a reference value to the first switch.

The present invention has been briefly described above. Further, details of the present invention will be clarified by reading an aspect (hereinafter, referred to as an "embodiment") for implementing the invention to be described below with reference to the accompanying drawings.

DESCRIPTION OF EMBODIMENTS

A specific embodiment according to the present invention will be described below with reference to the accompanying drawings.

Figure 1:
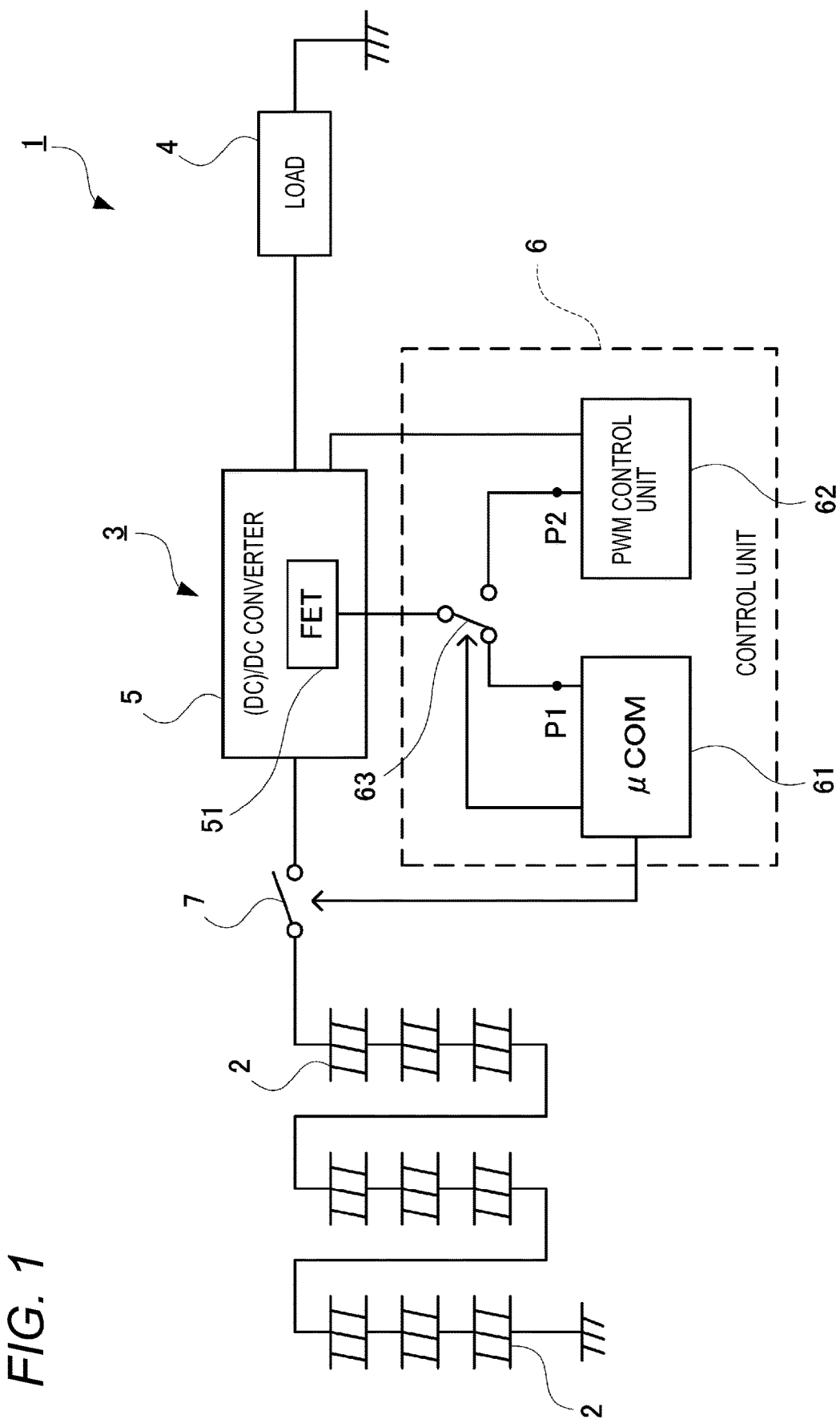
FIG. 1 is a block diagram showing an embodiment of a power supply system incorporating a switching power supply apparatus according to the present invention.

A power supply system 1 incorporating a switching power supply apparatus according to the present invention is mounted on an automobile. As shown in FIG. 1, the power supply system 1 includes an electric double-layer capacitor (EDLC) 2, a switching power supply apparatus 3 that boosts (converts) an input voltage, which is a power supply voltage supplied from the EDLC 2, and a load 4 to which power is supplied from the switching power supply apparatus 3.

A plurality of EDLCs 2 are connected in series to obtain a large capacity. The EDLC 2 is mounted on a vehicle, for example, for use as a backup power supply for an in-vehicle battery, or for use in energy supply at the time of starting an engine of an idling stop system, energy regeneration at the time of braking, power assist, and the like.

The switching power supply apparatus 3 includes a direct current (DC)/DC converter 5, a control unit 6 that controls the DC/DC converter 5, and a switch 7. The DC/DC converter 5 is a well-known DC/DC converter including a choke coil (not shown) and a field effect transistor (FET) 51 as a first switch for turning on and off power supply from the EDLC 2 to the choke coil. By controlling the on/off duty of the FET 51, an output voltage from the DC/DC converter 5 can be adjusted.

In the present embodiment, the control unit 6 includes a microcomputer (hereinafter, referred to as μCOM) 61 as a first pulse signal generation unit, a pulse width modulation (PWM) control unit 62 as a second pulse signal generation unit, and a changeover switch 63 as a changeover unit. The μCOM 61 includes a central processing unit (CPU) that operates in accordance with a program stored in a memory, and controls the entire switching power supply apparatus 3. The μCOM 61 can output a first PWM signal P1 as a first pulse signal whose duty gradually decreases from 100%.

The PWM control unit 62 is a well-known PWM control unit including a differential amplifier (not shown) that outputs a difference between a reference value and an output current from the DC/DC converter 5 to the load 4 detected by a sense resistor, and a comparator (not shown) that compares an output of the differential amplifier with a triangular wave and outputs a second PWM signal P2 as a second pulse signal. The PWM control unit 62 outputs the second PWM signal P2 whose duty is controlled so that the output current becomes the reference value.

The changeover switch 63 is provided between a gate of the FET 51, and an output terminal of the second PWM signal P2 of the PWM control unit 62 and an output terminal of the first PWM signal P1 of the μCOM 61, and switches a connection destination of the gate of the FET 51 between the μCOM 61 and the PWM control unit 62. The changeover switch 63 is controlled by the μCOM 61.

The switch 7 is provided between the EDLC 2 and the DC/DC converter 5. When the switch 7 is turned on, power is supplied from the EDLC 2 to the DC/DC converter 5. When the switch 7 is turned off, the power supplied from the EDLC 2 to the DC/DC converter 5 is shut off. The switch 7 is controlled by the μCOM 61.

Figure 2:
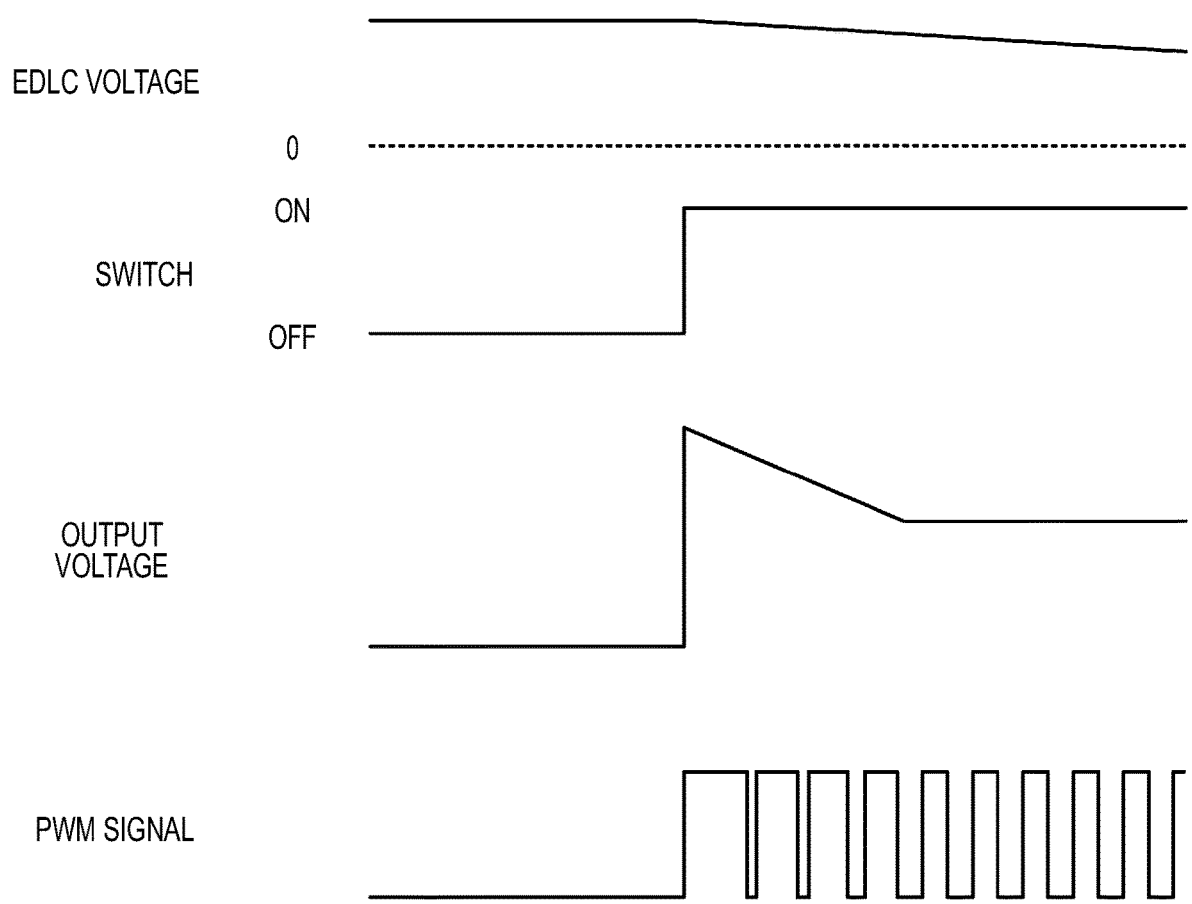
FIG. 2 shows a time chart of a voltage of an EDLC shown in FIG. 1, on/off of a switch, an output voltage of a DC/DC converter, and a PWM signal input to a gate of an FET.

Next, operations of the power supply system 1 having the above-described configuration will be described below with reference to a time chart shown in FIG. 2. FIG. 2 shows the time chart of the voltage of the EDLC 2 shown in FIG. 1, on/off of the switch 7, the output voltage of the DC/DC converter 5, and the PWM signal input to the gate of the FET 51. First, the μCOM 61 turns on the switch 7 to start the supply of the input voltage from the EDLC 2 to the DC/DC converter 5. At this time, the μCOM 61 switches the changeover switch 63 to the μCOM 61 at a timing when the switch 7 is switched from off to on.

Further, the μCOM 61 outputs the first PWM signal P1 having a duty of 100% at the timing at which the switch 7 is switched from off to on, and then gradually decreases the duty of the first PWM signal P1. As a result, the output voltage of the DC/DC converter 5 rises to a voltage higher than a constant value without delay from an on state of the switch 7, and gradually decreases as the duty decreases.

Thereafter, when a predetermined time elapses after the switch 7 is turned on, the μCOM 61 switches the changeover switch 63 to the PWM control unit 62. Accordingly, the second PWM signal P2 output from the PWM control unit 62 is output to the FET 51. As a result, the output voltage of the DC/DC converter 5 becomes the constant value such that the output current becomes the reference value.

Figure 3:
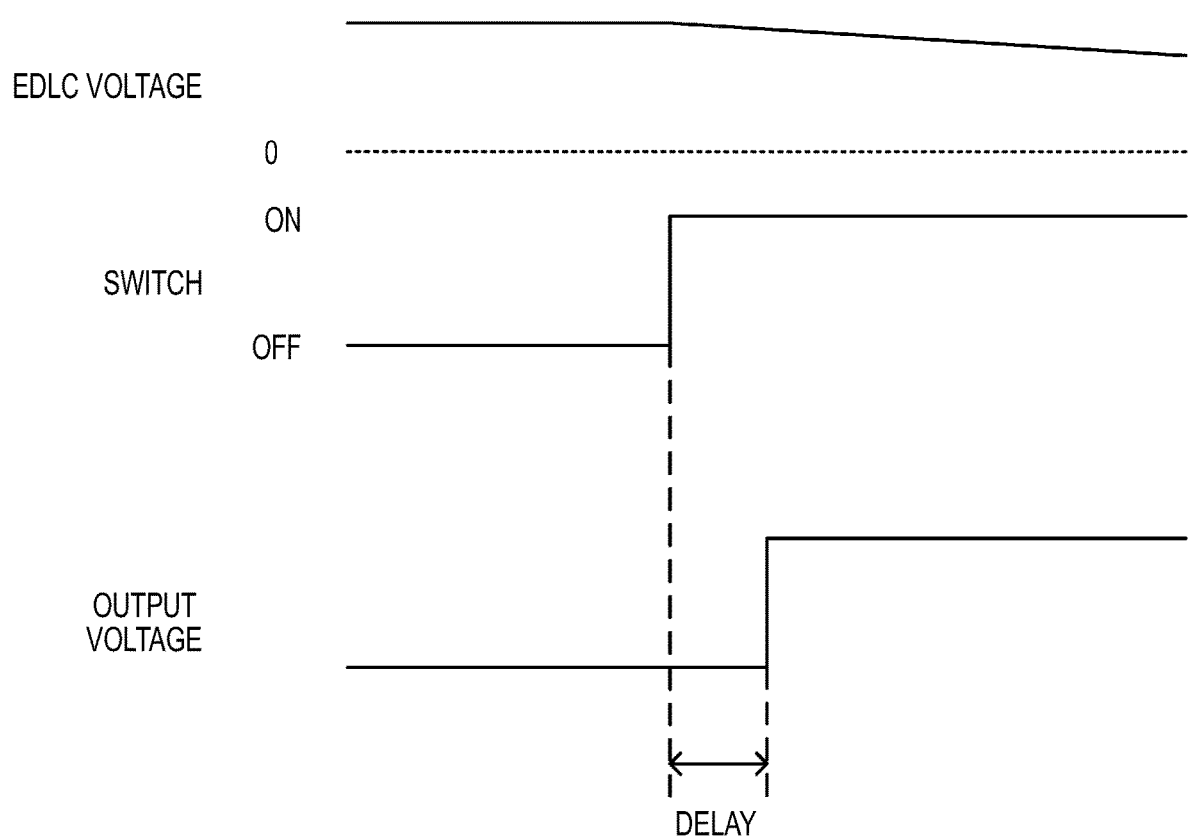
FIG. 3 shows a time chart of a voltage of the EDLC, on/off of the switch, and an output voltage of the DC/DC converter in a comparative example.

Next, effects of the present embodiment will be described with reference to a time chart of FIG. 3. FIG. 3 is a time chart showing a voltage of the EDLC 2, on/off of the switch 7, and an output voltage of the DC/DC converter 5 in a comparative example in which only the second PWM signal P2 output from the PWM control unit 62 is supplied to the FET 51. As described above, the PWM control unit 62 performs so-called feedback control for controlling the duty based on the output current. For this reason, even when the switch 7 is turned on, it is not possible to immediately output the duty such that the output current becomes the reference value, and as shown in FIG. 3, the output voltage becomes the constant value after the switch 7 is turned on.

In contrast, according to the present embodiment, when the power supply from the EDLC 2 to the DC/DC converter 5 is started as described above, the first PWM signal P1 whose duty gradually decreases from 100% is output, and thus the delay of the output can be reduced.

Further, since the duty of the first PWM signal P1 supplied to the FET 51 gradually decreases from 100%, discharge of the EDLC 2 can be prevented. By determining a time for outputting the duty of 100% based on a pulse limit curve of the sense resistor for detecting the output current, it is not necessary to increase the sense resistor.

Further, according to the above-described embodiment, the switch 7 is provided between the EDLC 2 and the DC/DC converter 5. As a result, when the switch 7 is switched from off to on, the changeover switch 63 is switched to the μCOM 61, and the first PWM signal P1 can be supplied from the μCOM 61 to the FET 51.

Further, according to the above-described embodiment, when the supply of the input voltage from the EDLC 2 to the DC/DC converter 5 is started, the control unit 6 switches the connection destination of the gate of the FET 51 to the μCOM 61, and switches the connection destination of the gate of the FET 51 to the PWM control unit 62 after the predetermined time elapses. Accordingly, with a simple configuration, it is possible to output the first PWM signal P1 whose duty gradually decreases from 100% at the start of the power supply, and then output the second PWM signal P2 whose duty is controlled so that the output current becomes the reference value.

The present invention is not limited to the above-described embodiment, and modifications, improvements, and the like can be made as appropriate. In addition, materials, shapes, dimensions, numbers, arrangement locations, and the like of elements in the above-described embodiment are optional and not limited as long as the object of the present invention can be achieved.

According to the above-described embodiment, the switch 7 is provided between the DC/DC converter 5 and the EDLC 2, but the present invention is not limited thereto. It is not essential to provide the switch 7, and the FET 51 may be used instead of the switch 7. In this case, a timing at which the switch FET 51 is switched from a long-term off state to the on state is a timing at which the power supply from the EDLC 2 to the DC/DC converter 5 is started.

According to the above-described embodiment, the control unit 6 is provided with the PWM control unit 62 and the μCOM 61 and is switched by the changeover switch 63, but the present invention is not limited thereto. The μCOM 61 may function as the PWM control unit 62, and the PWM control unit 62 may not be provided.

According to the above-described embodiment, the PWM control unit 62 outputs the duty such that the output current of the DC/DC converter 5 becomes the reference value, but the present invention is not limited thereto. The PWM control unit 62 may output a duty such that the output voltage of the DC/DC converter 5 becomes the reference value.

According to the above-described embodiment, the power supply voltage from the EDLC 2 is supplied to the DC/DC converter 5 as the input voltage, but the present invention is not limited thereto. For example, a power supply voltage from a battery may be supplied as the input voltage of the DC/DC converter 5.

Here, characteristics of the embodiment of the switching power supply apparatus according to the present invention described above are summarized briefly in the following [1] to [4].

[1] A switching power supply apparatus (3) includes:
  a DC/DC converter (5) having a first switch (51) and configured to convert an input voltage by turning on and off the first switch (51); and a control unit (6) configured to output, when supply of the input voltage to the DC/DC converter (5) is started, a first pulse signal (P1) whose duty gradually decreases from 100% to the first switch (51), and then output a second pulse signal (P2) having a duty controlled so that an output voltage or an output current of the DC/DC converter (5) becomes a reference value to the first switch (51).

According to the configuration of [1], when the supply of the input voltage to the DC/DC converter (5) is started, the control unit (6) outputs the first pulse signal (P1) whose duty gradually decreases from 100% to the first switch (51), and then outputs the second pulse signal (P2) having the duty controlled so that the output voltage or the output current of the DC/DC converter (5) becomes the reference value to the first switch (51). As a result, an output delay of the output voltage of the DC/DC converter (5) can be reduced.

[2] In the switching power supply apparatus (3) according to [1], the input voltage is a power supply voltage of an electric double-layer capacitor (2).

According to the configuration of [2], when the power supply voltage from the electric double-layer capacitor (2) is input to the DC/DC converter (5), the output delay can be reduced.

[3] The switching power supply apparatus (3) according to [1] or [2] further includes:

a second switch (7) configured to turn on and off the supply of the input voltage, in which when the second switch (7) is switched from off to on, the control unit (6) outputs the first pulse signal (P1).

According to the configuration of [3], the first pulse signal (P1) can be easily output when the input voltage is supplied.

[4] In the switching power supply apparatus (3) according to any one of [1] to [3], the control unit (6) includes:

a first pulse signal generation unit (61) configured to generate the first pulse signal (P1);

a second pulse signal generation unit (62) configured to generate the second pulse signal (P2); and a changeover unit (63) configured to switch a connection destination of the first switch (51) between the first pulse signal generation unit (61) and the second pulse signal generation unit (62), and when the supply of the input voltage is started, the connection destination is switched to the first pulse signal generation unit (61), and after a predetermined time elapses, the connection destination is switched to the second pulse signal generation unit (62).

According to the configuration of [4], it is possible to switch from the first pulse signal (P1) to the second pulse signal (P2) with a simple configuration.

According to the present invention, it is possible to provide a switching power supply apparatus capable of reducing an output delay.

What is claimed is:

1. A switching power supply apparatus comprising:
a DC/DC converter having a first switch and configured to convert an input voltage by turning on and off the first switch; and
a control unit configured to start outputting, when supply of the input voltage to the DC/DC converter is started, a first pulse signal whose duty gradually decreases from 100% to the first switch, and then output a second pulse signal having a duty controlled so that an output voltage or an output current of the DC/DC converter becomes a reference value to the first switch,
wherein, at a time the first pulse signal starts to be outputted, the output voltage of the DC/DC converter rises to a voltage higher than a constant value without delay and gradually decreases as the duty decreases.

2. The switching power supply apparatus according to claim 1,
wherein the input voltage is a power supply voltage of an electric double-layer capacitor that is connected to an input of the DC/DC converter.

3. The switching power supply apparatus according to claim 1 further comprising:
a second switch configured to turn on and off the supply of the input voltage,
wherein when the second switch is switched from off to on, the control unit starts outputting the first pulse signal.

4. The switching power supply apparatus according to claim 1,
wherein the control unit includes:
a first pulse signal generation unit configured to generate the first pulse signal,
a second pulse signal generation unit configured to generate the second pulse signal, and
a changeover unit configured to switch a connection destination of the first switch between the first pulse signal generation unit and the second pulse signal generation unit, and
when the supply of the input voltage is started, the connection destination is switched to the first pulse signal generation unit, and after a predetermined time elapses, the connection destination is switched to the second pulse signal generation unit.

* * * * *